S. HOWELL.
FILM FEEDING MECHANISM FOR MOTION PICTURE CAMERAS AND THE LIKE.
APPLICATION FILED OCT. 11, 1919.

1,417,524.

Patented May 30, 1922.
4 SHEETS—SHEET 1.

Inventor
Albert S. Howell.
By Miehle & Miehle.
Attorneys.

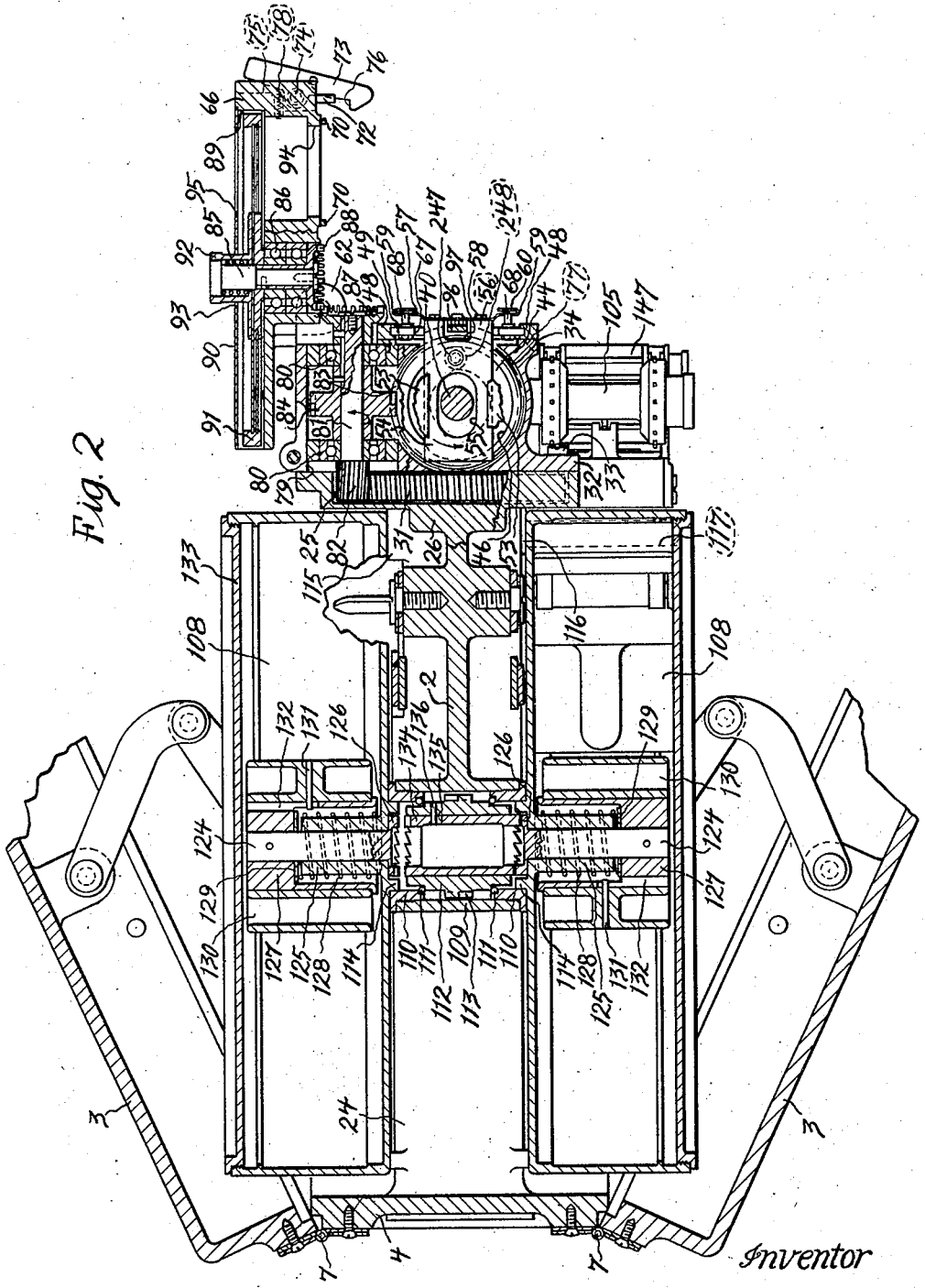

A. S. HOWELL.
FILM FEEDING MECHANISM FOR MOTION PICTURE CAMERAS AND THE LIKE.
APPLICATION FILED OCT. 11, 1919.
1,417,524.
Patented May 30, 1922.
4 SHEETS—SHEET 3.
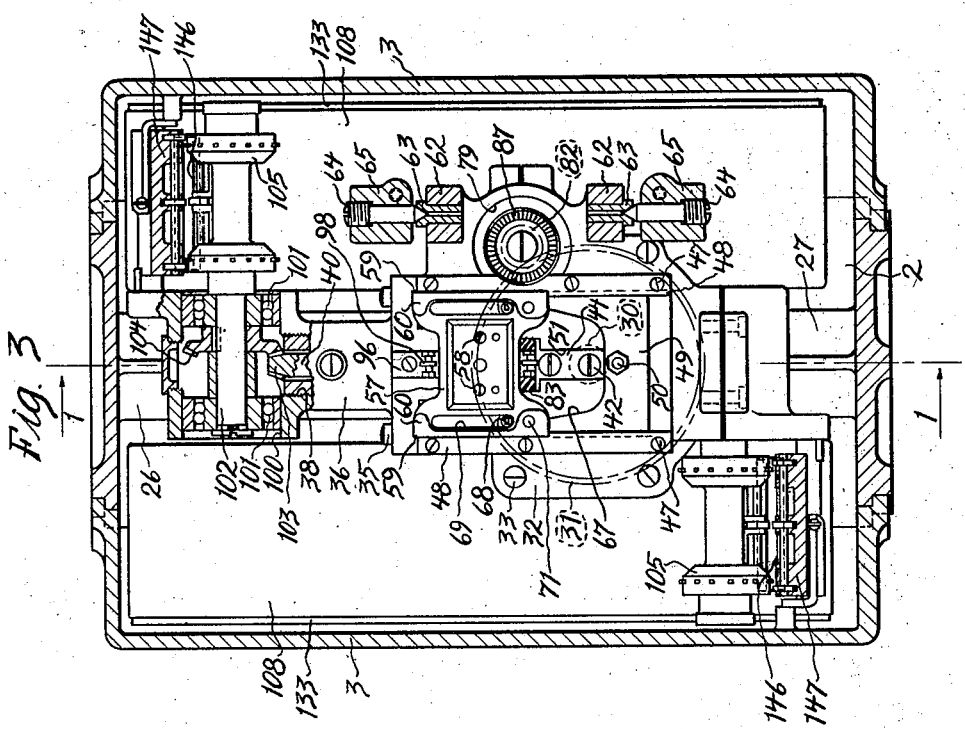
Inventor
Albert S. Howell.
By Miehle + Miehle,
Attorneys.

A. S. HOWELL.
FILM FEEDING MECHANISM FOR MOTION PICTURE CAMERAS AND THE LIKE.
APPLICATION FILED OCT. 11, 1919.
1,417,524.
Patented May 30, 1922.
4 SHEETS—SHEET 4.
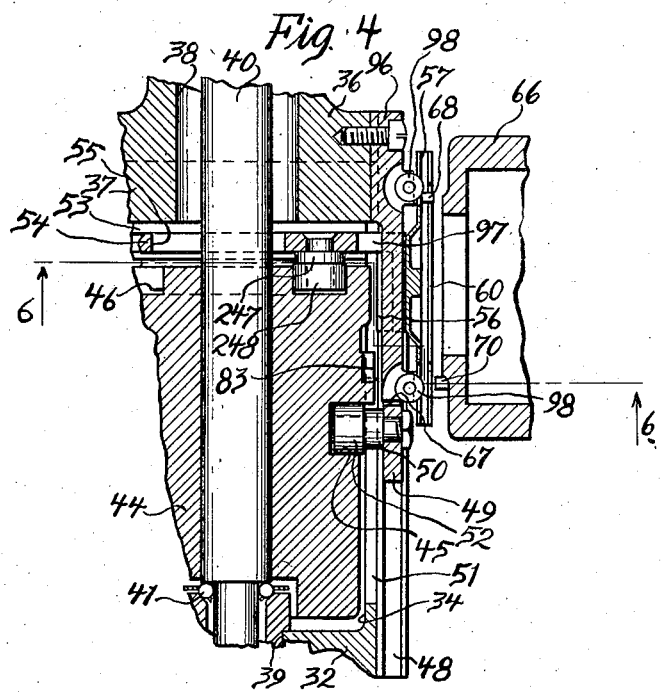
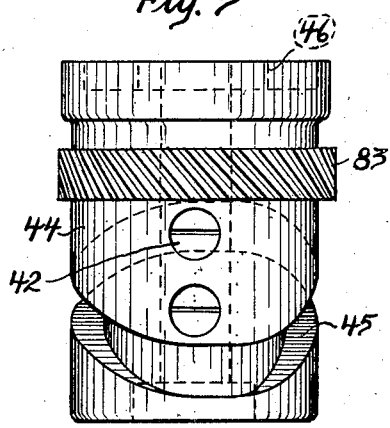
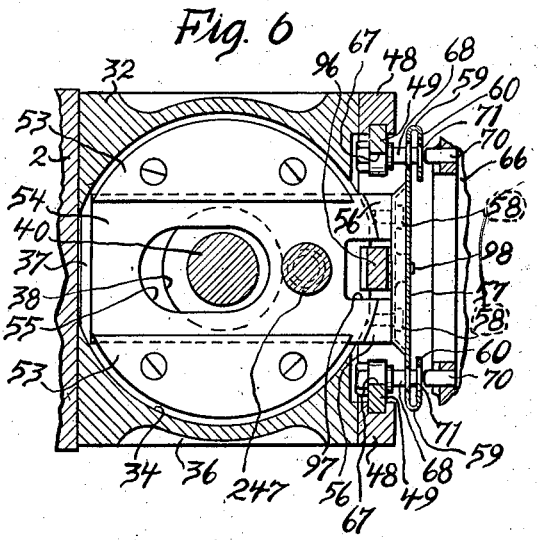
Inventor
Albert S. Howell
By Miehle & Miehle
Attorneys.

UNITED STATES PATENT OFFICE.

ALBERT S. HOWELL, OF CHICAGO, ILLINOIS, ASSIGNOR TO BELL AND HOWELL COMPANY, OF CHICAGO, ILLINOIS, A CORPORATION OF ILLINOIS.

FILM-FEEDING MECHANISM FOR MOTION-PICTURE CAMERAS AND THE LIKE.

1,417,524.     Specification of Letters Patent.     Patented May 30, 1922.

Original application filed April 28, 1919, Serial No. 293,249. Divided and this application filed October 11, 1919. Serial No. 330,032.

*To all whom it may concern:*

Be it known that I, ALBERT S. HOWELL, a citizen of the United States, residing at Chicago, in the county of Cook and State of Illinois, have invented a certain new and useful Improvement in Film-Feeding Mechanism for Motion-Picture Cameras and the like, of which the following is a full, clear, concise, and exact description, reference being had to the accompanying drawings, forming a part of this specification.

My invention relates to film feeding mechanism for motion picture cameras and the like.

The features of the present invention relate to a construction, combination and arrangement of film feeding mechanism whereby the same may be designed very compactly with a relatively small number of operating parts of ample size and strength, which is easily machined and assembled, which has the driving parts enclosed, and which is adapted to an enclosed film magazine type of camera of convenient dimensions with a view toward accessibility, ease of operation and manipulation, and which is particularly adapted to the enclosed film magazine type camera described and claimed in U. S. application, Serial No. 293,249, filed by me April 28, 1919, for improvement in motion picture cameras and tripods of which the present application is a division.

The above features and certain other features hereinafter appearing are embodied in the preferred form of my invention hereinafter fully described and illustrated in the accompanying drawings, and are effected by certain novel constructions, combinations and arrangements of parts particularly pointed out in the claims.

In the said drawings Fig. 1 is a sectional view in side elevation of a motion picture camera embodying the features of my invention in their preferred form, this view being taken substantially on the line 1—1 of Fig. 3 described below.

Fig. 2 is a sectional view in plan elevation of the same substantially on the line 2—2 of Fig. 1 with certain of the parts in different positions as hereinafter described.

Fig. 3 is a sectional view in front elevation of the same substantially on the line 3—3 of Fig. 1.

Figure 4 is an enlarged fragmentary section on the line 1—1 of Fig. 3 showing the parts in another position of their cycle of operations.

Figure 5 is an enlarged view in side elevation of the cam cylinder, hereinafter described.

Figure 6 is a fragmentary section on the line 6—6 of Fig. 4.

Like characters of reference indicate like parts in the various views.

Figure 1:
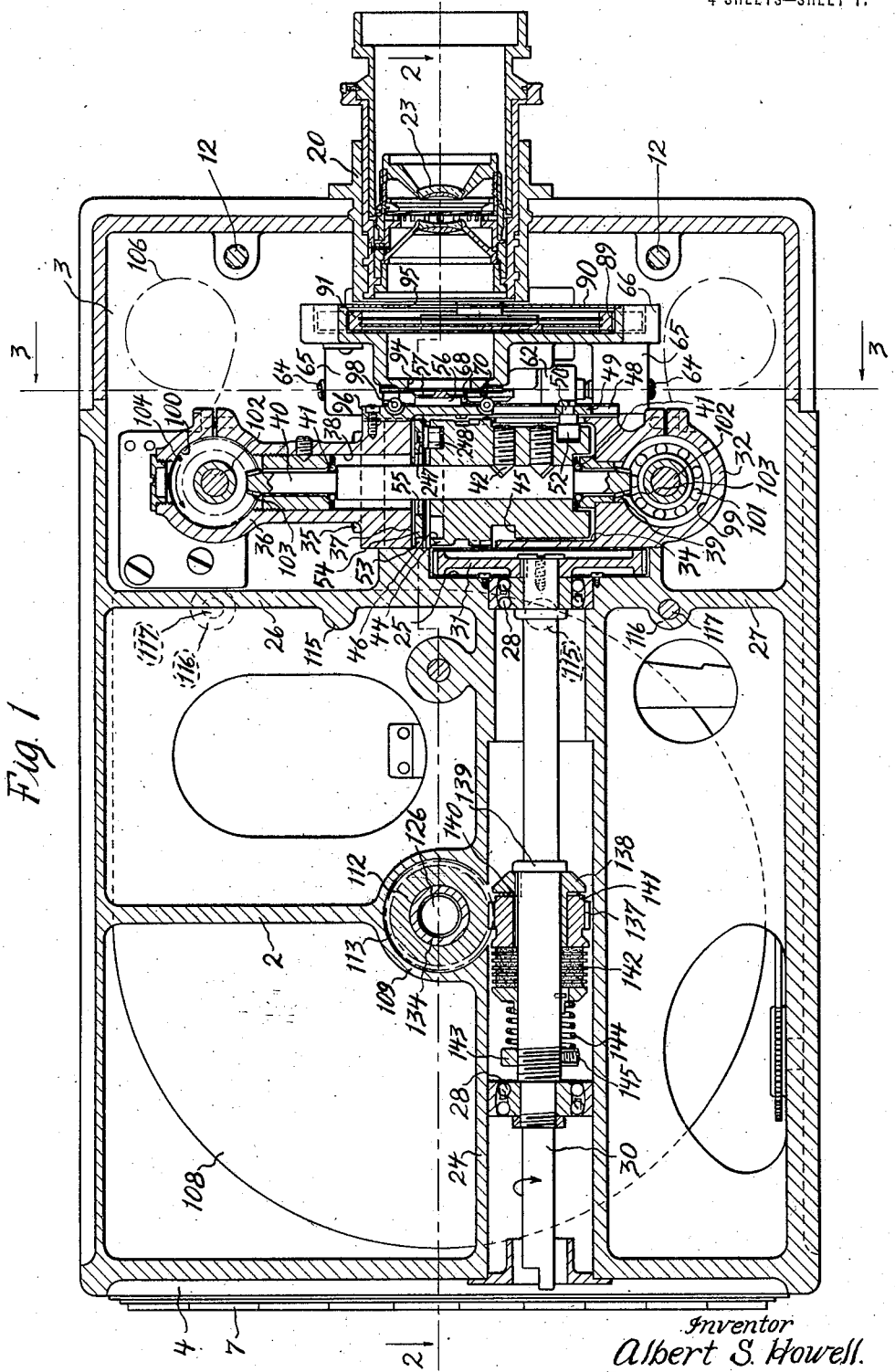

The casing of the camera is formed of a central frame and a closure 3 fitted to the central frame on either side thereof to form an enclosure thereabout, the central frame forming the central portion 4 of the rear wall of the camera and the center rearward portions of the upper and lower walls of the camera while the closures 3 form the front wall and complete the rear, top and bottom walls. The rear wall portions of the closures 3 are pivoted to the rear wall portion of the central frame by means of hinges 7 and are secured in closed position upon the central frame 2 by screws 12. The meeting edges of the frame 2 and closures 3 are stepped correspondingly, and the meeting edges of the front wall portions of the closures 3 are provided with oppositely disposed semi-circular concave portions forming a circular opening in the enclosure when the closures are in closed position. Mounted in this opening is a bush 20 secured to one of the closures and a camera lens 23 of usual construction is carried within the bore thereof in a manner fully described and claimed in U. S. application, Serial No. 330,144, filed by me Oct. 11, 1919, for improvement in Camera Lens Mounts, divided from the aforementioned application.

As above described the central frame 2 is provided with a central rear wall portion 4 and upper and lower wall portions, and extending horizontally from the rear wall portion 4 is a tubular formation 24 spaced from the upper and lower wall portions of the central frame and terminating at its front end in an enlargement in which the bore of the formation is enlarged as indicated at 25, the front end of this formation being supported by ribs 26 and 27 respectively extending between the upper wall portion of the central frame and the formation and the lower wall portion of the central frame and the formation. Mounted for rotation on bearings 28 within the bore of this formation is a horizontal shaft 30, and affixed to the front end of this shaft within the enlarged bore 25 is a gear 31. The front end of the formation is faced in a vertical plane just in front of the gear 31, and a supplemental frame 32 is secured to this face by headed screws 33, see Figs. 2 and 3, and encloses the front end of said enlarged bore 25. This supplemental frame is bored vertically, as indicated at 34, and has a horizontal face at its upper end. See Figs. 1 and 2. Secured to this face of the supplemental frame by means of headed screws 35 is an extension frame 36 having a turned extension 37 at its lower end projecting downwardly into the upper end of the bore 34 and engaging the sides thereof to center the extension frame with said bore. The extension frame 36 is provided with a vertical bore 38 smaller than bore 34 and disposed concentrically thereto, and the bore 34 is restricted at the lower end of the frame 32 to form a small bore 39 disposed concentrically to said bore 34. Extending through bores 34, 38, and 39 is a vertically disposed shaft 40 which is mounted on a bearing 41 disposed adjacent each end of the shaft and supported respectively in bores 38 and 39.

Secured upon the shaft 40 by means of set screws 43, screw-threaded into it and engaging respective conical depressions formed in the shaft, is a cam cylinder 44. The lower end of this cam cylinder forms a drum cam having a cam groove 45 and the extreme upper end of this cam cylinder forms a face cam disposed coaxially with the drum cam groove 45 and having a cam groove 46 facing upwardly.

The front side of the supplemental frame 32 is faced in a vertical plane and secured to this face by headed screws 47, see Fig. 3, in parallel spaced relation and extending vertically is a pair of slides 48 having vertical grooves facing each other. A U-shaped shuttle 49, having the legs of the U-shape thereof extending upwardly, is disposed between these slides and has its side edges engaging respective of said grooves to form a slide mounting for the shuttle. Mounted on the shuttle at the transverse portion of the U-shape at the lower end thereof and disposed midway between the slides 48 is a stud 50 which extends inwardly toward shaft 40 through a vertical slot 51 in the supplemental frame 32, and mounted for rotation on the inner end of this stud is a roller 52 which is engaged with the cam groove 45 of the drum cam whereby the shuttle is reciprocated in a vertical path parallel to the axis of the cams as the cams are rotated.

The lower end of the turned extension 37 of the extension frame 36 is disposed some distance above the upper end of the cam cylinder, and secured on the bottom of said extension 37 and extending in a forward and rearward direction is a second pair of slides 53 having horizontal grooves disposed normal to the plane of said shuttle and disposed in parallel spaced relation facing each other. The slides 53 are disposed on either side of the shaft 40, and a slide block 54, having an aperture 55 through which shaft 40 passes, see Fig. 2, has its side edges engaging respective of said grooves to form a slide mounting for the slide block. A downwardly extending stud 247 is secured to the slide block just forward of the aperture 55, and mounted on this stud is a roller 248 which is engaged in the cam groove 46 whereby the slide block is reciprocated in a horizontal path normal to the path of the shuttle 49. The slide block extends forwardly through an opening in the supplemental frame and the front end thereof is provided with two spaced downwardly extending lugs 56 disposed one at each side of the slide block. Disposed just in front of the shuttle is a register leaf 57 which has its rear broad side secured to said lugs by headed screws 58. This register leaf has one complete broad side, the rear of which is secured to lugs 56, and has parallel edges 59, the edges that are parallel to the path of the shuttle 49, upstanding therefrom to form edge guides for the film, and retaining portions 60 extending from said edges toward each other in spaced relation with said complete broad side and spaced from each other throughout the entire length of the leaf to leave the center portion of this side open whereby a film may be inserted in the register leaf therethrough by bending the film lengthwise to permit the side edges thereof to pass through said opening. This register leaf is fully described and claimed in the aforementioned U. S. application Serial No. 293,249, filed by me April 28, 1919.

Formed on the supplemental frame 32 and extending to one side and in front thereof is a pair of supports 62 disposed in vertical spaced relation with each other. A bush 63 is fitted to each support at the outer end thereof. These bushes are disposed coaxially on a vertical axis and the upper bush has an upwardly facing conical surface and the lower bush has a downwardly facing conical surface, which receive respective conical ends of adjustable bearing screws 64 screw threaded into respective wings 65, disposed respectively above and below the supports 62, of a shutter frame 66 whereby the shutter frame is pivotally mounted for limited swinging movement upon the supplemental frame 32, which shutter frame, when closed, see Fig. 1, lies transversely just in front of register leaf 57, and which, when open, see Fig. 2, lies longitudinally to one side of said register leaf to allow the film to be inserted into the register leaf as above described and to permit access to the mechanism.

The opening formed by the upright U-shape of the shuttle 49 as designated at 67 allows vertical reciprocal movements thereof without interference with slide block 54 or the support 96 hereinafter described, and mounted, one on each side of the shuttle, at the free ends of the legs thereof are two horizontally spaced shuttle pins 68 projecting forwardly therefrom. When the register leaf is positioned in its rear position, see Figs. 4 and 6 these shuttle pins project through respective vertical slots 69 formed in the rear side of the register leaf and engage the usual side perforations in a film held in the register leaf and move the same downwardly with the downward movement of the shuttle. Mounted on the rear side of the shuttle frame and projecting rearwardly therefrom and disposed below the lowest position of the shuttle pins 68 is a pair of stationary pilot pins 70 which are spaced in a horizontal plane and adapted, when the shutter frame is in closed position, see Fig. 1, and the register leaf is in its forward position, to project through respective apertures 71 formed in the retaining portions 60 and the rear side of the register leaf to insure the film remaining stationary while the shuttle pins are not in engagement with perforations thereof. In the operation of this step by step mechanism the movements of the shuttle take place in the following order by reason of the timed relation of the cam grooves 45 and 46 which actuate the shuttle 49 and register leaf 57 in reciprocal paths normal to each other as hereinbefore described. Starting in the cycle of operation as shown in Figs 1, 2 and 3 of the drawings, where the shuttle is at the lower end of its stroke, the register leaf is in its forward position to hold the film in engagement with the stationary pilot pins 70 projecting through apertures 71 to engage the film and hold it stationary. As the cam cylinder 44 turns, in a counter-clockwise direction, see the arrow in Fig. 2, the cam groove 45, acting through means hereinbefore described, moves the shuttle upwardly, perforations of the film being disengaged from the shuttle pins 68 during this movement by reason of the fact that the register leaf 57 is held in its forward position with the film therein forward of the path of said shuttle pins, perforations of the film being engaged with stationary pilot pins 70 when in this position. When the shuttle reaches the upper end of its movement the cam groove 46, acting through means hereinbefore described, moves the register leaf 57 rearwardly to disengage perforations of the film from stationary pilot pins 70 and to engage perforations of the film with shuttle pins 68, see Figs. 4 and 6. After perforations of the film have been engaged by the shuttle pins the cam groove 45 moves the shuttle and film downwardly, and after the shuttle has reached the lower end of its movement the register leaf and film are moved forwardly to disengage perforations of the film from shuttle pins 68 and to engage perforations of the film with stationary pilot pins 70 to complete the cycle of operation. My U. S. Patent No. 1,038,586, granted Sept. 17, 1912, concerns a step by step movement of this general character, but it will be noted that in the mechanism herein shown the operating parts are very strong and durable, the arrangement is very compact, a great portion of the parts are enclosed, and that the device is particularly adapted to an enclosed film magazine type camera.

The shutter frame 66 is provided with a spacing stud 72 see Fig. 2 extending from the rear surface thereof to engage the front face of the adjacent slide 48 when the shutter frame is in closed position to position the same. The shutter frame is maintained in its closed position with stud 72 engaging the front face of the adjacent slide by means of a hook latch lever 73 pivoted on a vertically disposed pin 74 mounted on the shutter frame and disposed within a horizontal slot 75 formed in the shutter frame. This latch lever extends forwardly and rearwardly of the pin 74 and has a hook 76 facing forwardly when the shutter frame is in closed position, which hook engages the rear surface of the adjacent slide 48, at a point where the supplemental frame 32 is cut away, as designated at 77, see Fig. 2, when the shutter frame is in closed position to maintain the stud 72 in engagement with said adjacent slide 48. A coiled compression spring 78 is disposed in a horizontal bore of the shutter frame in front of the pin 74 and abuts the latch lever and the bottom of said bore and normally maintains the latch lever in locked position, see Fig. 2. The front end of the latch lever extends beyond the shutter frame so that it may be conveniently manipulated to move the shutter frame from its closed position.

As hereinbefore described the gear 31 is affixed to the front end of shaft 30 within the enlarged bore 25 enclosed by supplemental frame 32. The supplemental frame 32 is extended laterally at the side from which supports 62 extend and between the same, and a horizontal bore 79 is formed therein, see Fig. 2, parallel with shaft 30 and alongside and communicating with bore 34 of the frame 32 and enlarged bore 25. Disposed within this bore and supported therein on bearings 80 in parallelism to shaft 30 is a shaft 81. Formed on the rear end of this shaft and meshing with gear 31 is a gear 82. The cam cylinder has spiral gear teeth 83 formed thereon which mesh with a spiral gear 84 fixedly mounted on shaft 81 between bearings 80 whereby the cam cylinder is driven from shaft 30. A shutter shaft 85 is mounted in bearings 86 within a bore of the rear wall of the shutter frame 66, and is disposed to aline with shaft 81 when the shutter frame is in closed position. Fixedly mounted on the front end of shaft 81 is a forwardly facing crown wheel 87, and fixedly mounted at the rear end of shutter shaft 85 is a rearwardly facing crown wheel 88 meshing with gear 87. The pivotal axis of the shutter frame is so disposed with relation to these gears 87 and 88 that these gears are always in mesh regardless of the pivotal position of the shutter frame, see Fig. 2. When the shutter frame is in closed position all of the teeth of each of these gears are intermeshed.

It is necessary that the shutter shaft 85 make one revolution to each revolution of the cam cylinder 44. The intermeshing spiral gear teeth 83 and spiral gear 84 permit of this without enlarging the mechanism, either by multiplying the parts or separating the present parts to an inconvenient and possibly impractical degree. It will be noted that the pitch diameter of gear 84 is smaller than the pitch diameter of spiral gear teeth 83 whose size is controlled by the size of the cam cylinder 44. Therefore, to effect the present compact arrangement the spiral gear 84 has the same number of teeth as there are spiral gear teeth 83 and the angle of the gear teeth 83 with relation to the axis of the cam cylinder is greater than the angle of the teeth of spiral gear 84 with relation to the axis of shaft 81, in the present case this angle of spiral gear teeth 83 being 57° and the angle of the teeth of spiral gear 84 being 33°.

In the driving train above described, when pictures are being taken, the shaft 30 rotates in a clock-wise direction looking forward, as indicated by the arrow in Fig. 1, and the shaft 81 rotates oppositely, as indicated by the arrow in Fig. 2. The angles of spiral gear teeth 83 and spiral gear 84 are so disposed that the shaft 40 and cam cylinder 44 rotate in a counter-clockwise direction as before described. The shutter shaft 85 rotates in the same direction as does the shaft 81 by reason of the connection therebetween as hereinbefore described.

The shutter frame 66 has a forwardly facing enlarged bore 89 formed therein concentric with shutter shaft 85, and has a cover 90 secured to the front end thereof enclosing this bore. Mounted on the shutter shaft within this bore is a shutter 91 of the usual adjustable aperture type, the adjustment knob 92 of which extends through a concentric aperture 93 formed in the cover 90. See Fig. 2.

The rear wall of the shutter frame 66 is offset rearwardly in front of register leaf 57 and is provided with a "frame" aperture 94 through which the image is projected on the film in the register leaf and the surrounding edge of this aperture is extended rearwardly to lie within the retaining portions 60 of the register leaf to press the film in the register leaf against the forward face of the rear broad side of the register leaf when the register leaf is in its forward position. The cover 90 has an aperture 95 in alinement with the aperture 94 with relation to lens 23, and light is transmitted through both of these apertures upon the film when the shutter is in exposing position to expose the film in the register leaf.

Secured upon the extension frame 36 is a support 96 extending vertically downwardly therefrom between lugs 56 of slide block 54, and rearwardly of register leaf 57, the slide block being cut away rearwardly between said lugs as indicated at 97, to clear this support in all positions of the slide block. A roller 98 mounted for rotation on this support on a horizontal transverse axis is disposed above and below the register leaf, and these rollers are disposed to engage the center of the film when the register leaf is in its rearward position, see Fig. 4, and hold the same forwardly away from the rear broad side of the register leaf when the shuttle is moving the film downwardly in the register leaf to prevent scratching of the film by the register leaf. The cut away portion 67 of the shuttle is formed to clear this support in all positions of the shuttle.

The lower end of the supplemental frame 32 has a transverse horizontal bore 99 formed therein communicating with the lower end of the hereinbefore described bore 39 thereof. The upper end of the extension frame 36 has a transverse horizontal bore 100 formed therein communicating with the upper end of the hereinbefore described bore 38 thereof. Supported for rotation in each of these bores on two spaced bearings 101 is a film sprocket shaft 102 which is disposed normal to the shaft 40. See Figs. 1 and 3. These shafts are disposed transversely of the camera and extend outwardly from their respective frames on opposite sides of shaft 40, the upper shaft 102 extending to the right from shaft 40 above the step by step mechanism and the lower shaft 102 extending to the left from shaft 40 below the step by step mechanism. See Fig. 3. A bevel gear pinion 103 is formed at each end of the shaft 40, and each of these pinions meshes with a bevel gear 104 fixed upon the adjacent shaft 102 and disposed between the respective bearings 101. These bevel gear connections are so arranged that the shafts 102 rotate in the same direction, counter-clockwise in Fig. 1. A film sprocket 105 is fixed on the extending ends of each shaft 102 in the usual manner, and in the operation of the machine the film passes over the upper film sprocket 105 in front of which it makes a downward spiral right hand loop; after which it passes downwardly through register leaf 57, and below this makes a second right hand loop and passes under the lower film sprocket 105 as indicated by the dot and dash line 106 in Fig. 1.

Thus the driving and supporting arrangement of the film sprockets 105 with relation to the step by step mechanism provides a very simple, strong and compact mechanism, the operating parts of which may be easily enclosed, and are in the form shown, and which is particularly adapted to an enclosed film magazine type camera.

Disposed one on each side of the tubular formation 24 of frame 2 and shaft 30 at the rear of respective film sprockets 105 and disposed in parallelism with each other is a pair of film magazines 108 the axes of which are coaxial. The axes of these film magazines are disposed in parallelism with said film sprockets and are coaxial with a transverse tubular formation 109 disposed above the tubular formation 24 and shaft 30 and normal thereto. Screw-threaded into each end of the tubular formation 109 is a bearing cup 110, the inner ends of which form oppositely disposed ball races. These bearing cups are bored concentrically, and supported concentrically thereof for rotation thereon, by balls 111 engaging respective of said oppositely disposed races, formed at the inner ends of the bearing cups, and engaging respective oppositely disposed ball races formed thereon is a gear sleeve 112 having spiral gear teeth 113 formed on the periphery thereof between the cups 110 whereby the gear sleeve is driven by means hereinafter described. The inner walls of the film magazines have circular ribs 114 formed on the outer faces thereof concentric with the axes thereof which fit into the bores of the respective bearing cups 110 to center the magazines upon the frame 2 coaxially with gear sleeve 112. These outer faces of the magazines engage the outer faces of the respective bearing cups 110 and in addition engage faces of respective extensions 115 and 116 extending laterally respectively from ribs 26 and 27 from respective sides faced in the plane of the outer surface of the respective bearing cup 110. The shape of the magazines in a plane normal to their axis is defined by three quarters of a circle and two oppositely extending tangents thereof meeting at an angle of 90°, see Fig. 1. The magazines are disposed in the camera so that one tangential side portion of each magazine is disposed vertically and faces the respective film sprocket. The extensions 116 are disposed adjacent the vertical side of the respective magazine and are provided with studs 117 extending laterally from the surface thereof and engaging transverse holes formed in the adjacent wall of the respective magazines to cooperate with the respective circular ribs 114 to locate the magazines on the frame 2. See Figs. 1 and 2. The extensions 115 and 116 and bearing cup 110 of each magazine are separated from each other but form a surface to which the respective magazine is detachably secured.

Each film magazine 108 is provided with a shaft 124, see Fig 2, which is disposed in axial alinement with gear sleeve 112 and mounted for rotation in a concentrically bored hub 125 within the enclosure of the magazine and formed on the inner wall thereof. The inner end of each shaft 124 has an enlarged clutch portion 126 forming a shoulder engaging the inner face of the inner wall of the respective magazine to provide a thrust bearing to prevent movement of the shaft outwardly. Each shaft 124 extends outwardly beyond the outer end of respective hub 125 and has an arbor 127 secured thereon which extends inwardly therefrom with a concentric cylindrical portion spaced from the periphery of the hub 125 and forming an enclosure thereabout. A coiled compression spring 128 is disposed within this enclosure and abuts the inner wall of the respective magazine and a friction ring 129, encircling the shaft 124 between hub 125 and arbor 127, with its opposite ends to retain the shoulder of the enlarged clutch portion 126 in engagement with the inner face of the inner wall of the magazine and to provide a light frictional resistance against rotation of shaft 124. Winding reels 130, upon which the film is wound, are mounted on respective arbors 127 and are driven therefrom by radial pins 131, secured in the winding reels, engaging respective longitudinal slots 132 formed in the peripheries of the arbors and extending to the outer ends of the arbors to permit the removal of the winding reels therefrom. The usual covers 133 form the outer walls of the film magazines and are screw-threaded thereto to permit access to the interior of the magazines.

The shafts 124 and the gear sleeve 112 are disposed in axial alinement, the shafts being disposed at opposite ends of the gear sleeve. The gear sleeve is bored concentrically throughout its length and a clutch sleeve 134 is mounted therein for rotation and for longitudinal movement therein. The clutch sleeve is provided with a short spirally disposed slot 135 engaged by an inwardly extending radially disposed stud 136 mounted on the gear sleeve whereby a driving connection is established between these sleeves to allow limited rotatory and longitudinal movement of the clutch sleeve with relation to the gear sleeve. The clutch portions 126 of the shafts 124 are provided with inwardly facing backed off radially disposed clutch teeth, and the ends of the clutch sleeve are provided with corresponding backed off radially disposed clutch teeth adapted to engage the clutch teeth of the adjacent clutch portion 126 to establish a driving connection in one direction with the respective shaft. These clutch teeth are arranged so that the clutch sleeve will drive the respective shafts 124 in opposite directions and will drive one or the other shaft 124 depending upon the direction of rotation of the clutch sleeve. As the direction of rotation of the gear sleeve is reversed stud 136 acting in spiral slot 135 moves the clutch sleeve longitudinally to engage the clutch teeth at the opposite end thereof with the clutch teeth of the other clutch portion to drive the same in a direction opposite that in which the other clutch portion was driven before said reversal. The spiral gear teeth 113 of gear sleeve 112 mesh with a spiral gear 137 rotatably mounted on sleeve 138 fixed upon the shaft 30. The forward end of the sleeve 138 engages a shoulder 139 formed on shaft 30 to prevent forward movement of said sleeve on the shaft, and the portion of the sleeve in front of gear 137 is provided with a rearwardly facing shoulder 140, and a thrust ball bearing 141 is disposed between the front face of gear 137 and this shoulder to provide a forward thrust bearing for the gear. Rotatably supported upon shaft 30 rearwardly of gear 137 is a series of clutch plates 142, preferably alternating felt and metal plates, the rearward plate of which is metal and is mounted for longitudinal movement on shaft 30, this plate being secured to said shaft with relation to rotation thereon by a radially disposed stud 246 secured on the shaft and engaging a longitudinal slot formed in the bore of this plate. An adjusting collar 143 is screw-threaded upon shaft 30 rearwardly of these plates and spaced therefrom. A coiled compression spring 144 encircles the shaft 30 between the clutch plates and collar 143 and abuts the rearward plate and the collar with its opposite ends to complete a frictional drive between the shaft 30 and gear 137. The adjusting collar 143 is maintained in adjusted position on shaft 30 by a set screw 145 screw-threaded into said collar and engaging the shaft 30. The mechanism just described constitutes a frictionally driven take-up mechanism and needs no further description except to state that the take-up mechanism is adapted to drive the shaft 124 of the left hand film magazine, in Fig. 3, in a direction, clockwise in Fig. 1, to wind film fed thereto from lower film sprocket 105 when the operating parts are actuated in a forward direction to take pictures as hereinabove described, and that it is adapted to drive the shaft 124 of the right hand film magazine, in Fig. 3, in a direction, counter-clockwise in Fig. 1, to wind film fed thereto from upper film sprocket 105 when the operating parts are actuated in a reverse direction as is desirable at times in the operation of the machine.

The vertically disposed tangential side portion of each film magazine 108 is provided with a film opening 146, which film openings are disposed in alinement with the respective film sprockets 105, see Fig. 3. A film guide device 147 is provided for each film sprocket and serves, when in closed position, to maintain the film in engagement with the respective film sprocket and to guide the film to and from the respective film opening 146. These film guide devices are mounted upon extensions of the supplemental frames 32 and 36 respectively and require no further description for the present purposes, and are fully described and claimed in the aforementioned U. S. application, Serial No. 293,249, filed by me April 28, 1919.

From the above description it will be noted that a film feeding mechanism is provided which is very compact and is composed of a relatively small number of parts of ample size and strength, and which is well adapted to an enclosed magazine type camera of convenient dimensions, particularly of the characteristics described. It will be further noted that the film path is comparatively short and that the film moving mechanism guides the film properly and does not require additional guide means. In addition the driving mechanism is well adapted to be enclosed, and the formation of the supporting frames dispense with difficult machining and assembling operations although the driving parts are enclosed thereby.

The shutter device herein described as relating to the support and drive thereof and its relation to the film feeding mechanism, herein described and claimed, is fully described and claimed in U. S. application Serial No. 330,143, filed by me Oct. 11, 1919, for improvement in actuating mechanism for motion picture cameras and the like, divided from the aforementioned U. S. application, Serial No. 293,249, filed by me April 28, 1919.

While I have herein described and shown the preferred embodiment of my invention I do not wish to be limited to the precise details of construction shown as changes may readily be made without departing from the spirit of my invention, but having thus described my invention I claim as new and desire to secure by Letters Patent the following:

1. A device of the nature described including a pair of film magazines arranged in parallel spaced relation, a rotatably mounted drivingshaft disposed between said film magazines in parallelism therewith, a spur gear affixed to said shaft to rotate therewith and disposed outwardly of said magazines, step by step mechanism including rotatably mounted coaxial cams disposed on the side of said gear opposite said magazines in front of the adjacent end of said shaft on an axis normal thereto and parallel with said magazines, and a gear driving connection between said gear and said cams disposed outwardly of said magazines and including a second spur gear meshing with said first mentioned gear and spiral gearing.

2. A device of the nature described including a pair of film magazines arranged in parallel spaced relation; a rotatably mounted driving shaft disposed between said film magazines in parallelism therewith; a relatively large gear affixed to said shaft to rotate therewith and disposed outwardly of said magazines; step by step mechanism including rotatably mounted coaxial cams disposed on the side of said gear opposite said magazines in front of the adjacent end of said shaft; and a gear driving connection between said gear and said cams disposed outwardly of said magazines including a relatively small gear meshing with said first mentioned gear and a gear driving connection between said second mentioned gear and said cams.

3. A device of the nature described including a frame forming an enclosure, a pair of rotatably mounted cams within said enclosure connected to be rotated in unison, film engaging means without the enclosure adapted to be operated to advance the film step by step, a slide block mounted for reciprocating movement within the enclosure and extending within the enclosure from the exterior of the frame and operatively connected with said film engaging means, an operative connection between said film engaging means and one of said cams, said frame being cut away for said operative connection and said slide block, and a second operative connection within said enclosure between said slide block and said other cam.

4. A device of the nature described including a frame forming an enclosure, a drum cam rotatively mounted within said enclosure, a face cam within said enclosure and disposed coaxially and connected to be driven in unison with said drum cam, film engaging elements without the enclosure adapted to be operated to advance the film step by step, a slide block mounted for reciprocating movement at right angles to the axis of said cams, and extending within the enclosure over the grooved face of said face cam from the exterior of the frame and operatively connected with one of said film engaging elements to move the same therewith, an operative connection between another of said film engaging elements and said drum cam, said frame being cut away for said operative connection and said slide block, and an operative connection within said enclosure between said slide block and said face cam.

5. A device of the nature described including a frame forming an enclosure open at one end, a drum cam rotatively mounted within said enclosure on an axis substantially perpendicular to the plane of the open end of the enclosure, a face cam within said enclosure and disposed coaxially and connected to be driven in unison with said drum cam and disposed between the drum cam and the open end of said enclosure and having the cam face thereof facing the open end of said enclosure, a second frame element detachably secured on said frame and closing said open end of the enclosure, a shuttle mounted for reciprocating movement parallel to the axis of said cams exteriorly of said enclosure, a slide block adapted for reciprocating movement at right angles to the axis of said cams and the plane of movement of said shuttle and extending within said enclosure from the exterior of said first mentioned frame and over the groove face of said face cam, a slide mounting on said second mentioned frame supporting said slide block for its said movement within said enclosure, an operative connection between said shuttle and said drum cam, said first mentioned frame being cut away for said operative connection and said slide block, a register leaf mounted on said slide block exteriorly of said first mentioned frame and shuttle, an operative connection between said slide block and said face cam within said enclosure, and shuttle pins mounted on said shuttle and adapted to engage perforations of a film within the register leaf when said slide block is at one end of its reciprocal movement.

6. A device of the nature described including a rotatably mounted drum cam, a face cam disposed coaxially and connected to be driven in unison therewith, a U-shaped shuttle mounted for reciprocating movement parallel to the axis of said cams and disposed in a plane parallel to such axis with the open end of the U-shape thereof disposed adjacent the face cam, a slide block mounted adjacent the face cam for reciprocating movement in a direction at right angles to the axis of said cylinder and to the plane of said shuttle and having a lug portion disposed exteriorly of the periphery of the cams and in parallelism with the shuttle and extending toward the transverse portion of the U-shaped shuttle, a register leaf secured to said lug portion of the slide block and disposed in a plane parallel with the shuttle, an operative connection between said slide block and said face cam, an operative connection between said shuttle and said first mentioned cam disposed at the transverse portion of the shuttle, and pins mounted adjacent the free ends of the legs of the U-shaped shuttle and adapted to engage perforations of a film within the register leaf when the slide block is at one end of its reciprocal movement.

7. A device of the nature described including a U-shaped shuttle mounted for reciprocal movement longitudinally of the legs of the U-shape thereof, a slide mounting for said shuttle, a slide block mounted for reciprocating movement in a plane perpendicular to the plane of the shuttle and disposed adjacent the open end of the shuttle, a slide mounting for said slide block disposed on one side of the plane of said shuttle, a register leaf mounted on said slide block and disposed on the side of said shuttle opposite that on which said second mentioned slide mounting lies and disposed in a plane parallel with said shuttle, means for effecting reciprocating movement of said shuttle and slide block in cooperating relation including an operative connection with the shuttle at the transverse portion of the U-shape thereof, shuttle pins on said shuttle at the free ends of the legs of the U-shape thereof adapted to engage perforations of a film within said register leaf when the slide block is at the end of its movement in which position the register leaf is nearest adjacent the plane of the shuttle, and anti-friction means extending into the opening of the U-shape of said shuttle on the slide block side of said register leaf and adapted to engage the film beyond the end of said register leaf nearest adjacent the transverse portion of the shuttle and to maintain the film in spaced relation from the adjacent side of the register leaf when the register leaf is in said shuttle pin engaging position.

8. A device of the nature described including a relatively large rotatably mounted spur gear, step by step mechanism including a rotatably mounted cam cylinder provided with spaced cam grooves and disposed opposite one side of said gear on an axis normal thereto, and a driving connection between said gear and said cam cylinder including a relatively small spur gear disposed on an axis extending alongside said cam cylinder and meshing with said first mentioned gear and a spiral gear connection between said second mentioned gear and said cam cylinder including spiral gear teeth on said cam cylinder disposed between said cam grooves.

9. A device of the character described including a frame provided with a horizontal bore; a shaft rotatably mounted in said bore, said bore being enlarged at one end; a gear disposed within said enlarged end of said bore and affixed to said shaft; a supplemental frame secured to said first mentioned frame at the enlarged bore end thereof and enclosing said enlarged bore, said supplemental frame being bored; step by step mechanism including coaxial cams rotatably mounted in the bore of said supplemental frame on an axis disposed normal to said shaft; and a rotatory connection between said gear and said cams including a second gear meshing with said first mentioned gear, and spiral gearing.

10. A device of the character described including a frame provided with a horizontal bore; a shaft rotatably mounted in said bore, said bore being enlarged at one end; a gear disposed within said enlarged end of said bore and affixed to said shaft; a supplemental frame secured to said first mentioned frame at the enlarged bore end thereof and enclosing said enlarged bore, said supplemental frame being bored; step by step mechanism including coaxial cams rotatably mounted in the bore of said supplemental frame on an axis disposed normal to said shaft; a second shaft rotatably mounted in said supplemental frame on an axis disposed in parallelism with said first mentioned shaft; a gear affixed to said second shaft; and a spiral gear connection between said cams and said second shaft.

11. A device of the nature described including a frame provided with a horizontal bore enlarged at one end, a shaft rotatably mounted in said bore, a spur gear disposed within the enlarged end of said bore and secured to said shaft, a supplemental frame secured to said first mentioned frame and enclosing said large bore end thereof, said supplemental frame forming an enclosure communicating with said enlarged bore portion of said first mentioned frame, step by step mechanism including rotatably mounted coaxial cams disposed within the enclosure of said second mentioned frame on an axis normal to said first mentioned shaft, and a gear connection between said first mentioned gear and said cams including a spur gear meshing with said first mentioned gear within the enlarged bore portion of said first mentioned frame and spiral gearing disposed within the enclosure of said supplemental frame.

12. A device of the nature described including a frame forming an enclosure open at one end, step by step mechanism including coaxial cams disposed within said enclosure on an axis substantially perpendicular to the plane of said open end, a second frame detachably secured to said first mentioned frame and having a bore therein disposed coaxially with said cams and communicating with the enclosure of said first mentioned frame and having a second bore disposed transversely of the first mentioned bore thereof, a rotatably mounted shaft disposed coaxially with said cams and extending within said enclosure and the first mentioned bore of said second frame and secured with said cams, a second shaft disposed transversely of said shaft and extending within the second mentioned bore of said second mentioned frame from the exterior thereof and rotatably mounted therein, a film sprocket secured on said second shaft exteriorly of said second frames, and a gear connection between said first and second mentioned shafts within the enclosure of said second mentioned frame.

13. A device of the nature described including a frame forming an enclosure open at one end, step by step mechanism including a coaxially bored cam cylinder disposed within said enclosure on an axis substantially perpendicular to the plane of said open end, a second frame detachably secured to said first mentioned frame and having a bore therein disposed coaxially with said cam cylinder and communicating with the enclosure of said first mentioned frame and having a second bore disposed transversely of the first mentioned bore thereof and communicating with the same, a shaft carrying said cam cylinder and extending through the bore of the same and secured therewith, a bearing for said shaft at the end of the enclosure of said first mentioned frame opposite the open end thereof, a second bearing for said shaft in said second frame, a shaft disposed transversely of said shaft and extending within the second mentioned bore of said second mentioned frame from the exterior thereof and rotatably mounted therein, a film sprocket secured on said second shaft exteriorly of said frames, and a gear connection between said first and second mentioned shafts within the enclosure of said second mentioned frame.

14. A device of the nature described including a frame forming an enclosure open at one end and having a transverse bore at the opposite end communicating with said enclosure, step by step mechanism including a coaxially bored cam cylinder disposed within said enclosure on an axis substantially perpendicular to the plane of said open end, a second frame detachably secured to said first mentioned frame and having a bore therein disposed coaxially with said cam cylinder and communicating with the inclosure of said first mentioned frame and having a second bore disposed transversely of the other bore thereof and communicating with the same, a shaft carrying said cam cylinder and extending through the bore of the same and secured therewith, a bearing for said shaft in said first mentioned frame adjacent the transverse bore thereof, a second bearing for said shaft in said second frame, a shaft disposed transversely of said shaft and extending within the second mentioned bore of said second frame from the exterior thereof and rotatably mounted therein, a shaft disposed transversely of said first mentioned shaft and extending within the transverse bore of said first mentioned frame, a gear connection between each of said second and third mentioned shafts and the first mentioned shafts disposed within enclosures of respective frames, and a film sprocket secured on each of said second and third mentioned shafts exteriorly of said frames.

In testimony whereof, I hereunto affix my signature this ninth day of October, A. D., 1919.

ALBERT S. HOWELL.